April 4, 1961 C. R. FREEMAN 2,978,125

GRID LOADING DEVICE

Filed Feb. 20, 1959 12 Sheets-Sheet 1

INVENTOR

Carl R. Freeman

BY Michael Hertz

ATTORNEY

April 4, 1961

C. R. FREEMAN 2,978,125

GRID LOADING DEVICE

Filed Feb. 20, 1959

12 Sheets-Sheet 2

INVENTOR

Carl R. Freeman,

BY Michael Hertz,

ATTORNEY

GRID LOADING DEVICE

Filed Feb. 20, 1959

INVENTOR

Carl R. Freeman,

BY Michael Hertz,

ATTORNEY

INVENTOR
Carl R. Freeman,
BY Michael Hertz,
ATTORNEY

INVENTOR

Carl R. Freeman,

BY Michael Hertz,

ATTORNEY

INVENTOR
Carl R. Freeman,
BY Michael Hertz,
ATTORNEY

April 4, 1961 C. R. FREEMAN 2,978,125

GRID LOADING DEVICE

Filed Feb. 20, 1959 12 Sheets-Sheet 7

INVENTOR

Carl R. Freeman,

BY Michael Hertz

ATTORNEY

April 4, 1961 C. R. FREEMAN 2,978,125

GRID LOADING DEVICE

Filed Feb. 20, 1959 12 Sheets-Sheet 8

INVENTOR

Carl R. Freeman,

BY Michael Hertz.

ATTORNEY

INVENTOR
Carl R. Freeman,
BY Michael Hertz.
ATTORNEY

INVENTOR
Carl R. Freeman,
BY Michael Hertz
ATTORNEY

INVENTOR
Carl R. Freeman,

BY Michael Hertz,
ATTORNEY

INVENTOR
Carl R. Freeman,
BY Michael Hertz,
ATTORNEY

United States Patent Office 2,978,125

Patented Apr. 4, 1961

2,978,125

GRID LOADING DEVICE

Carl Raymond Freeman, Shawnee, Okla., assignor to Sylvania Electric Products Inc., Wilmington, Del., a corporation of Delaware Filed Feb. 20, 1959, Ser. No. 794,561

15 Claims. (Cl. 214—312)

This invention relates to an improvement in the feeding of grids lying in packets of a tray to an automount machine, which machine automatically assembles the grids with other parts of an electron tube to form a complete mount.

It is an object of this invention to effect a transfer of grids from a tray having pockets arranged in rows and columns and wherein the grids are located one in each pocket from the pockets to the machine, one by one, while the tray is in a position with the pockets facing downward.

It is a further object of this invention to provide an improved mechanism for handling the trays so that they may be received by the machine in stacked relation with the pockets facing upward, fed one by one in inverted relation over a discharge mechanism for the grids, and then, when voided of tray content, stacked in inverted relation in an empty tray storage rack.

It is a still further object of the invention to provide a mechanism for ensuring the feeding of the grids to the machine, one by one, and in proper orientated position with respect to the grid receiving unit of the automount machine.

These and other objects will be made clear upon consideration of the following specification when taken in conjunction with the accompanying drawings in which.

Figures 3, 17:
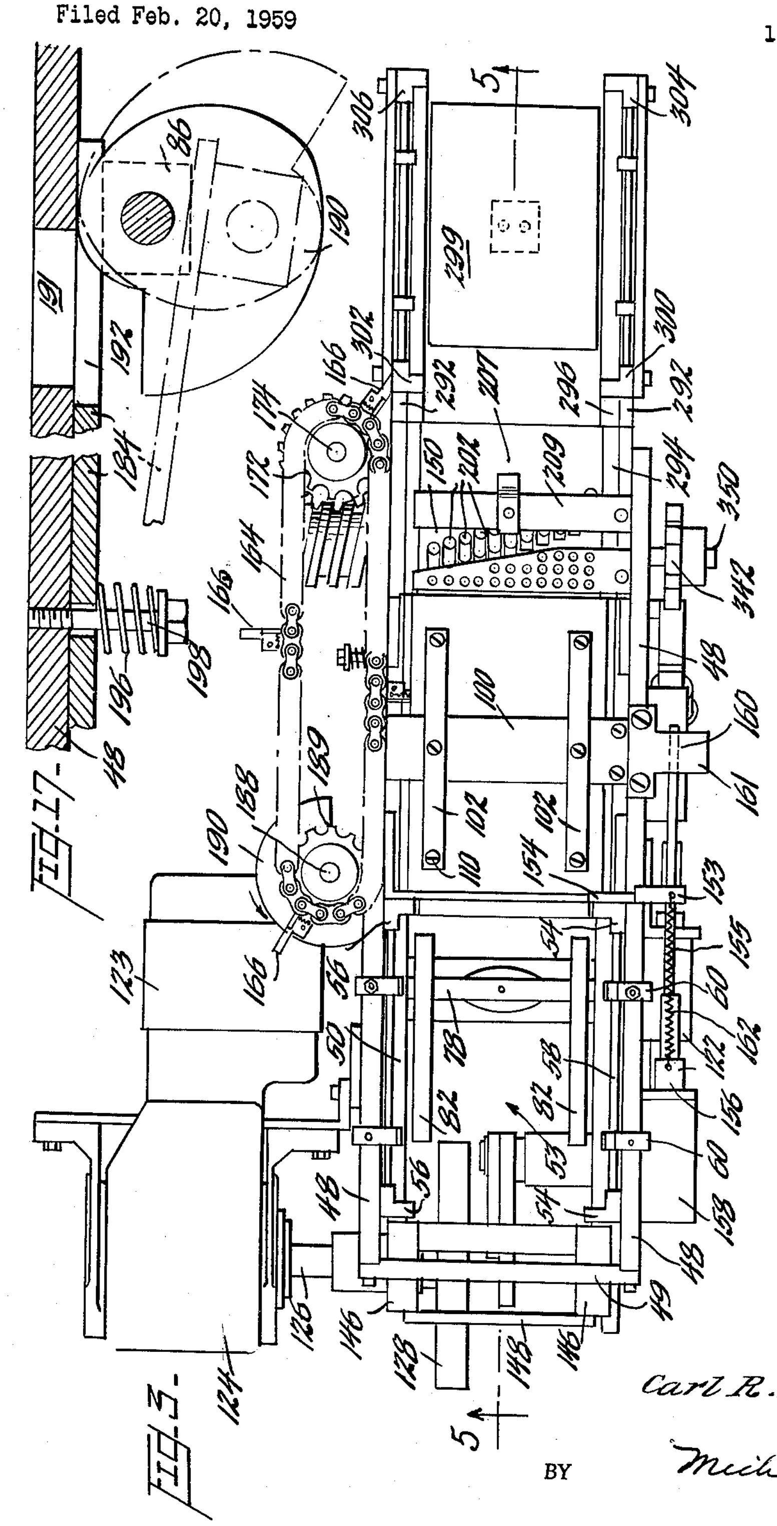
Fig. 3 is a plan view thereof.
Figure 5:
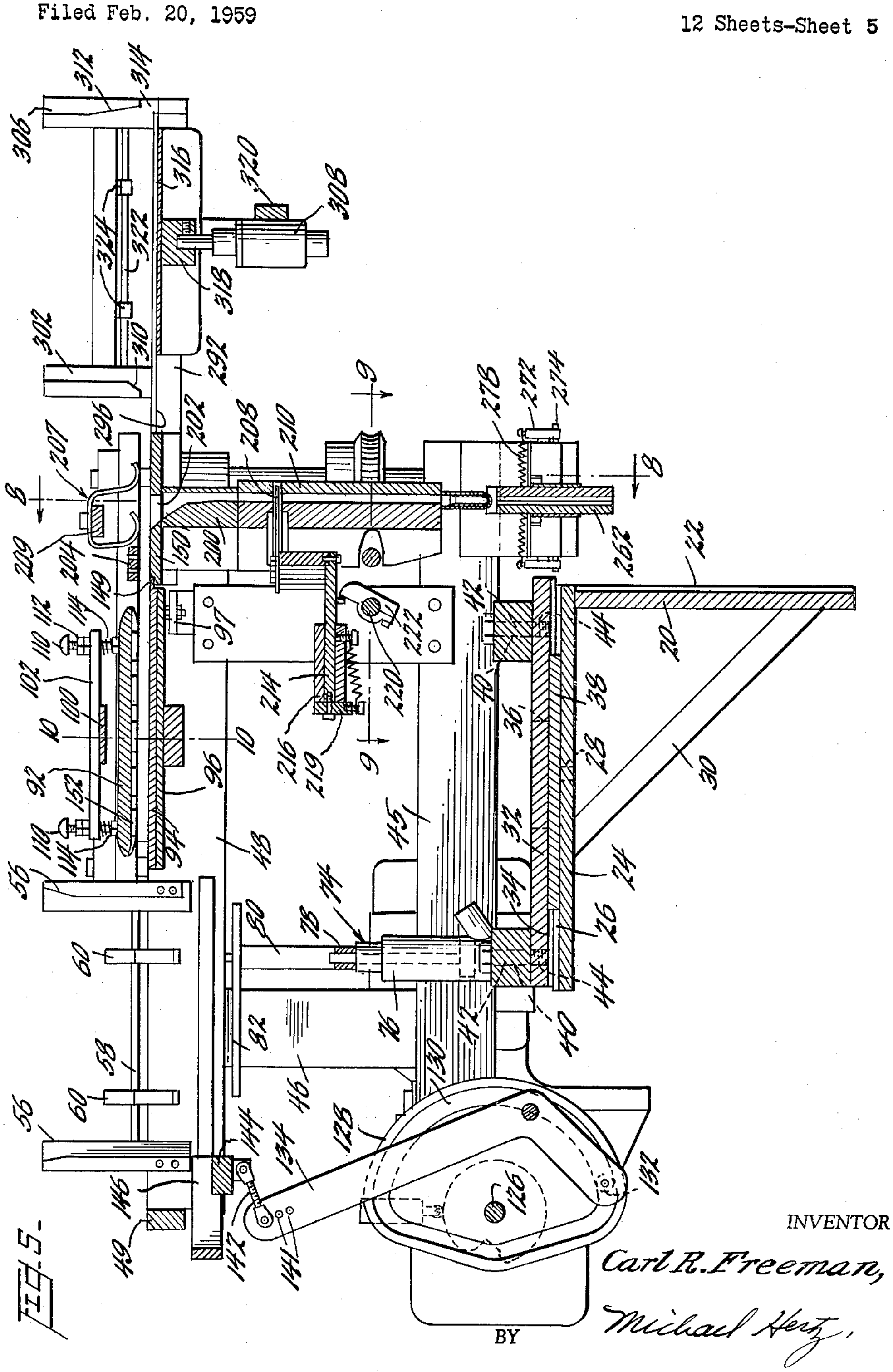

Fig. 5 it a central longitudinal section of the machine taken on the line 5—5 of Fig. 3.

Figures 6, 18:
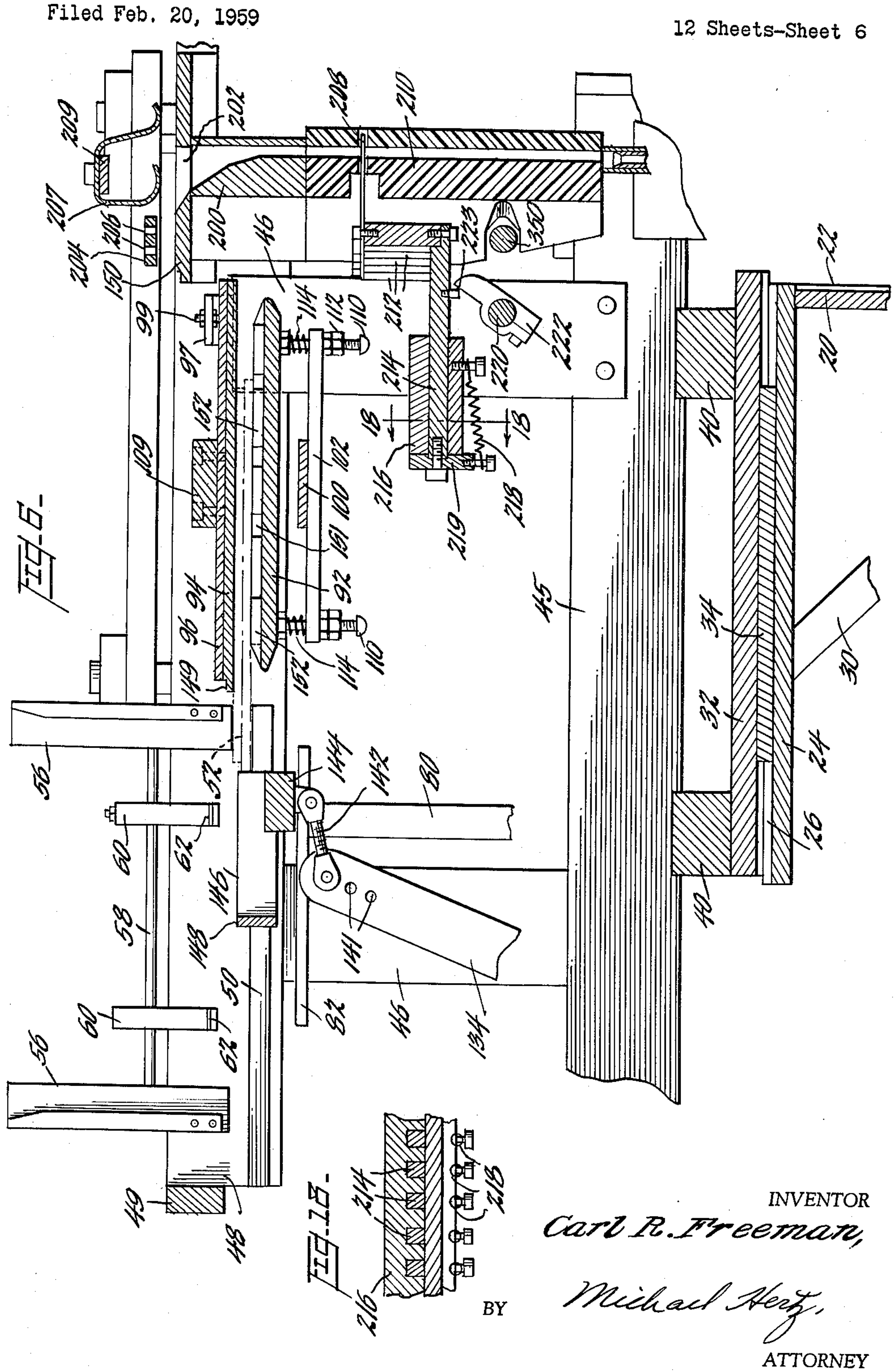

Fig. 6 is a fragmentary longitudinal side similar to Fig. 5 but with a tray inverting mechanism shown in a different receiving position or a fully loaded tray.

Figures 1, 20:
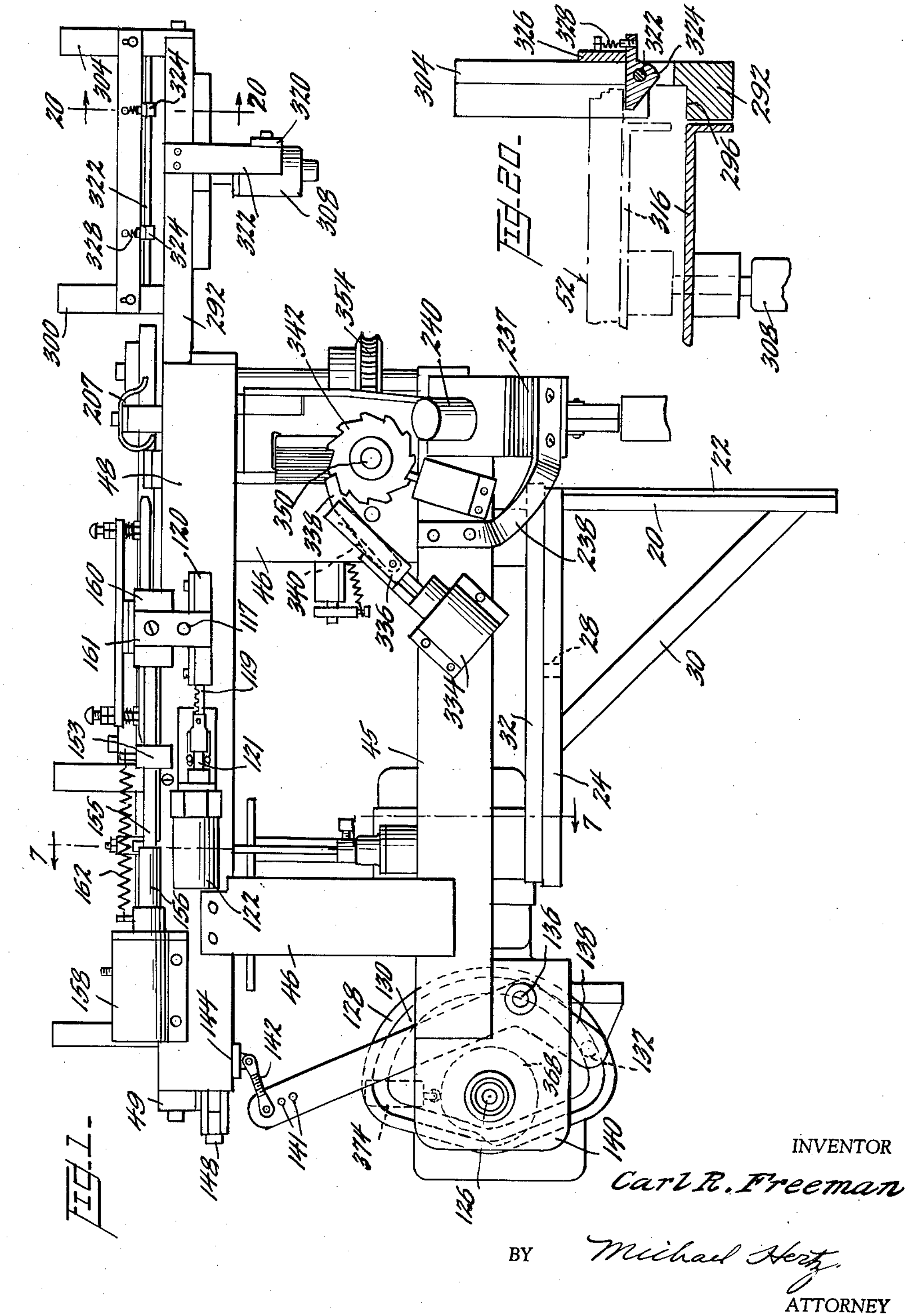
Fig. 1 is a side elevation of the machine.
Figure 7:
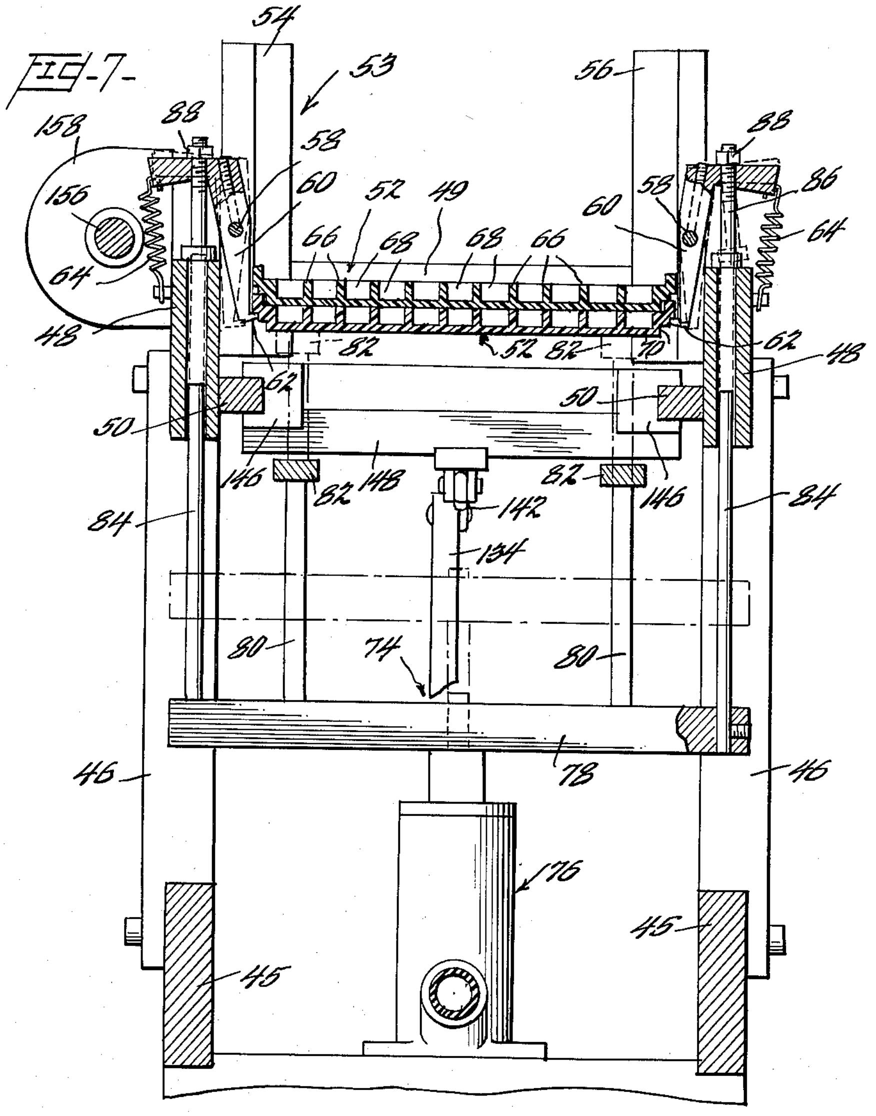

Fig. 7 is a cross section on the line 7—7 of Fig. 1.

Figure 8:
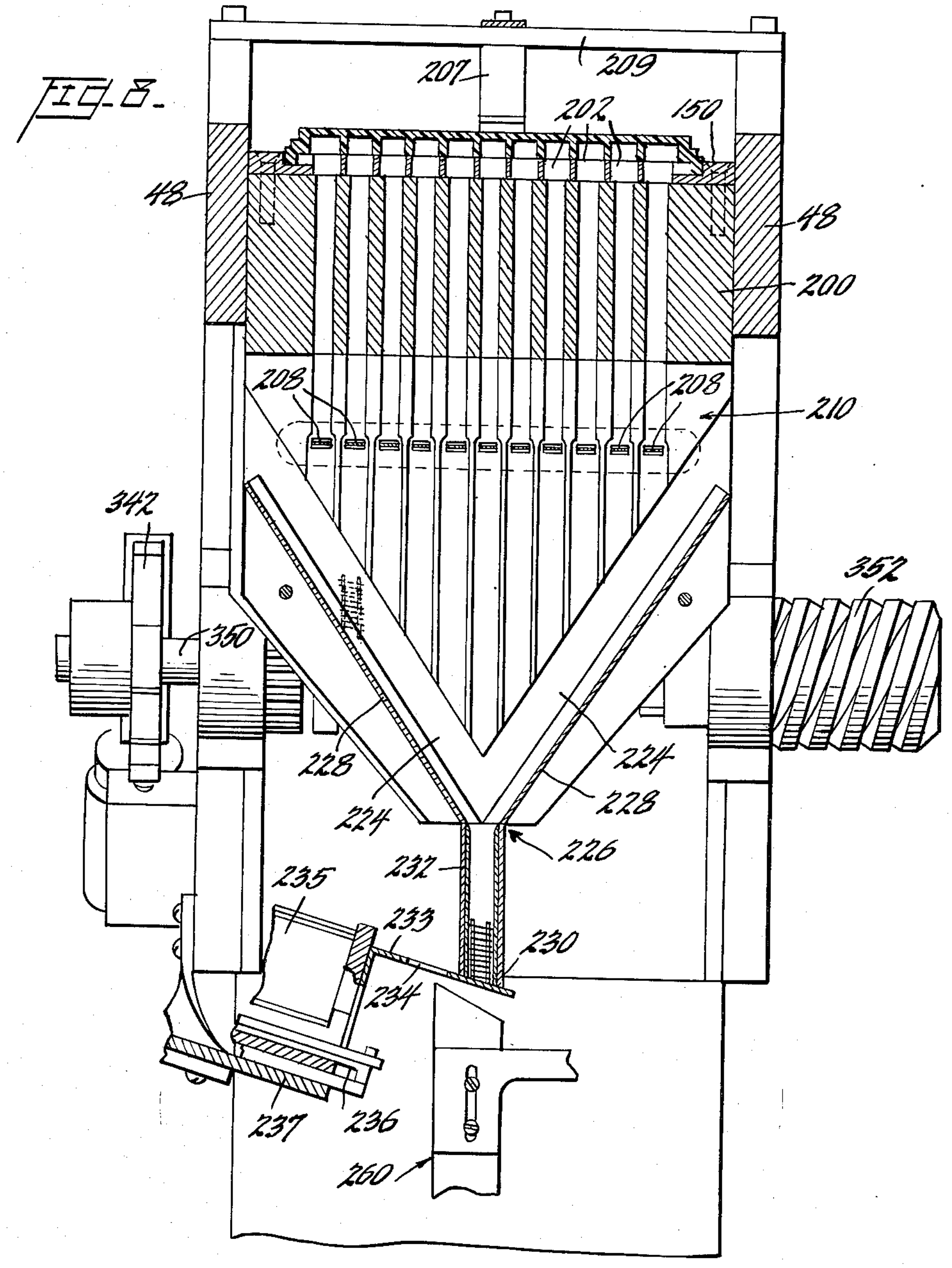

Fig. 8 is a vertical transverse section of the machine taken on the line 8—8 of Fig. 5.

Figure 9:
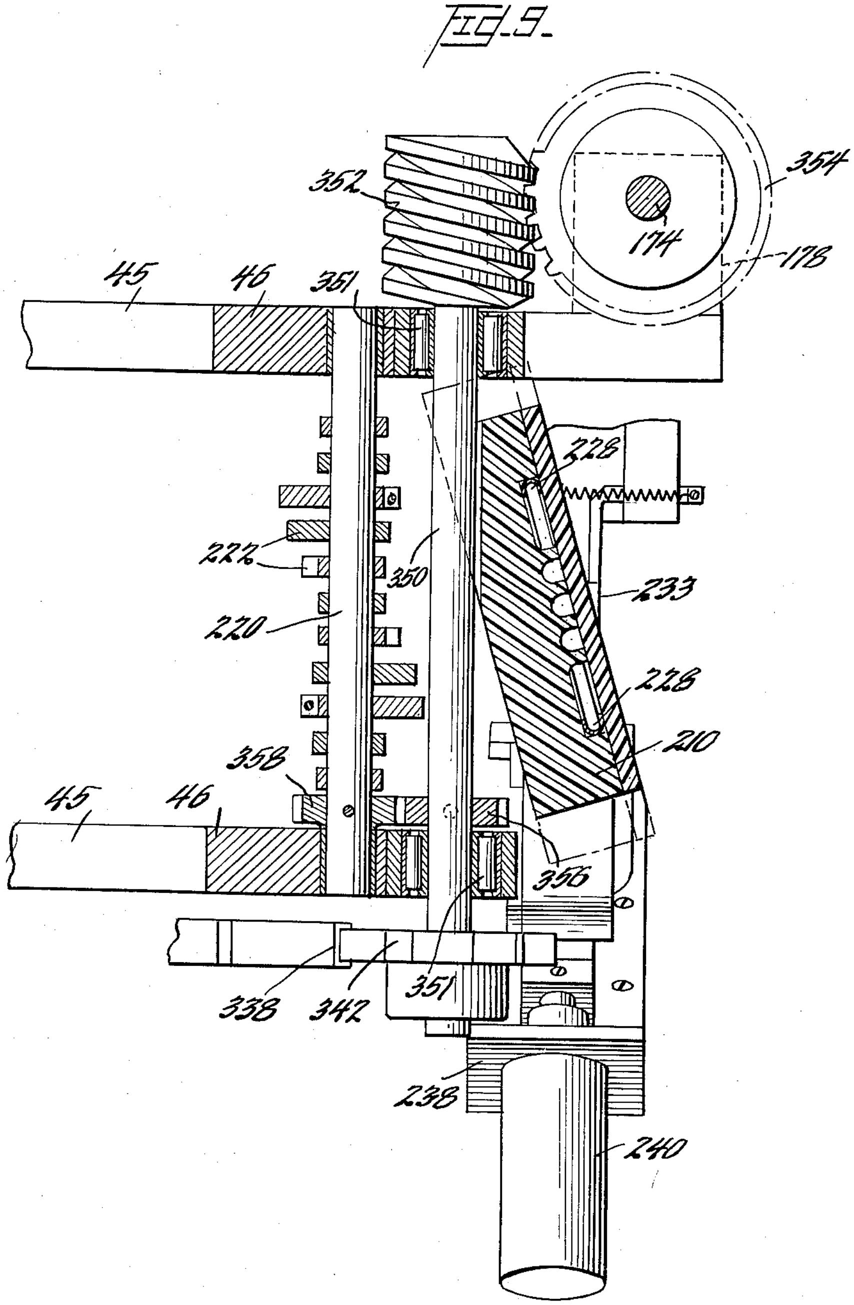

Fig. 9 is a horizontal section taken on the line 9—9 of Fig. 5.

Figure 10:
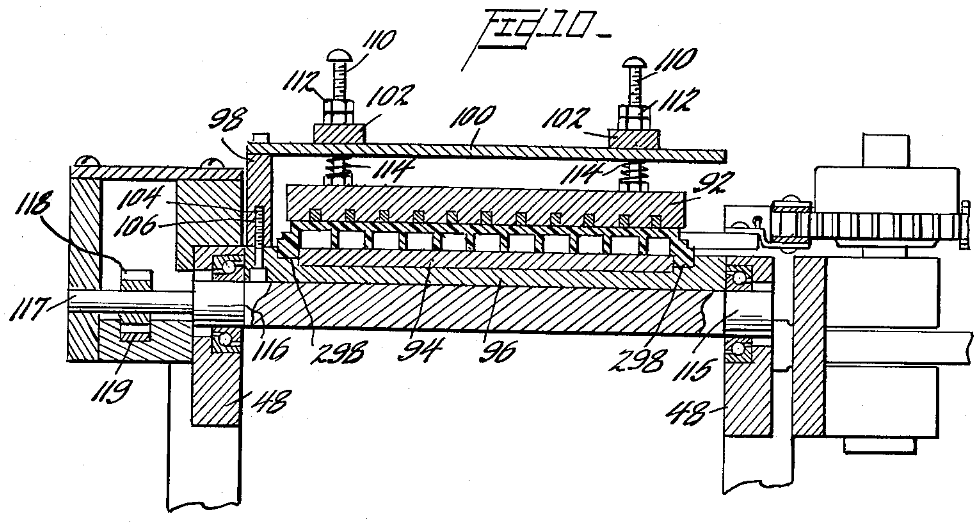

Fig. 10 is a transverse section on the line 10—10 of Fig. 5.

Figures 11, 19:
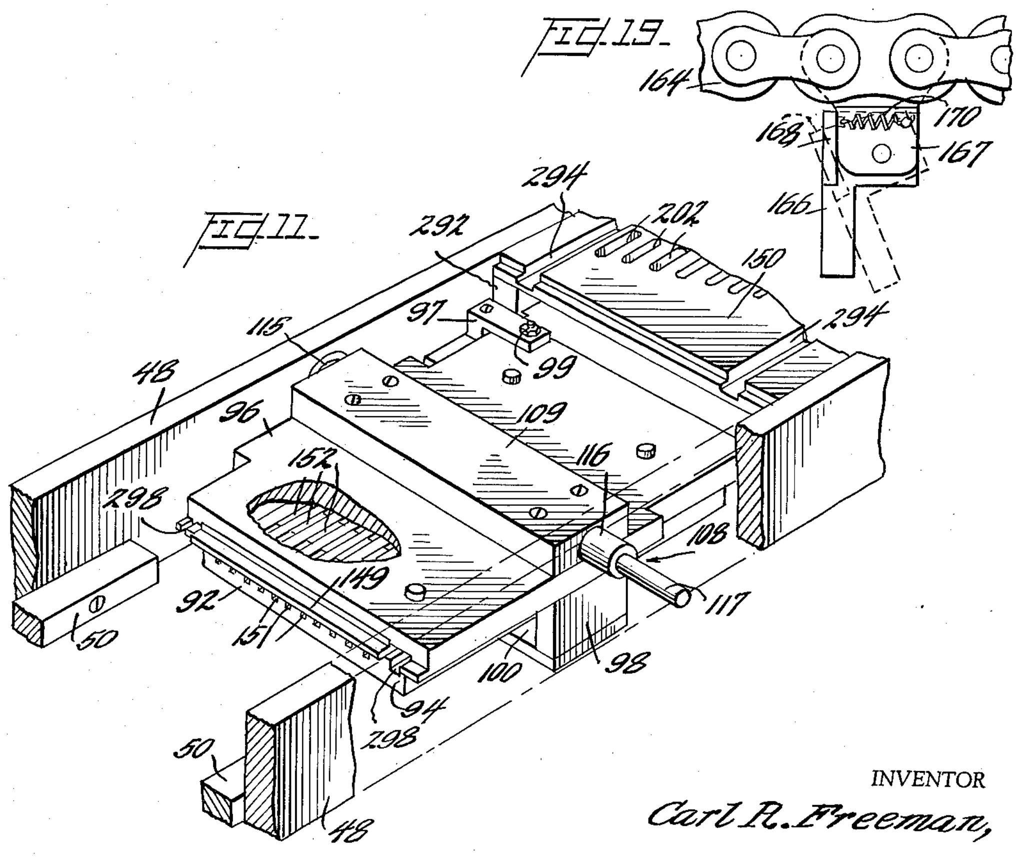

Fig. 11 is a perspective view of a portion of the tray inverting mechanism in position to receive a fully loaded tray.

Figure 12:
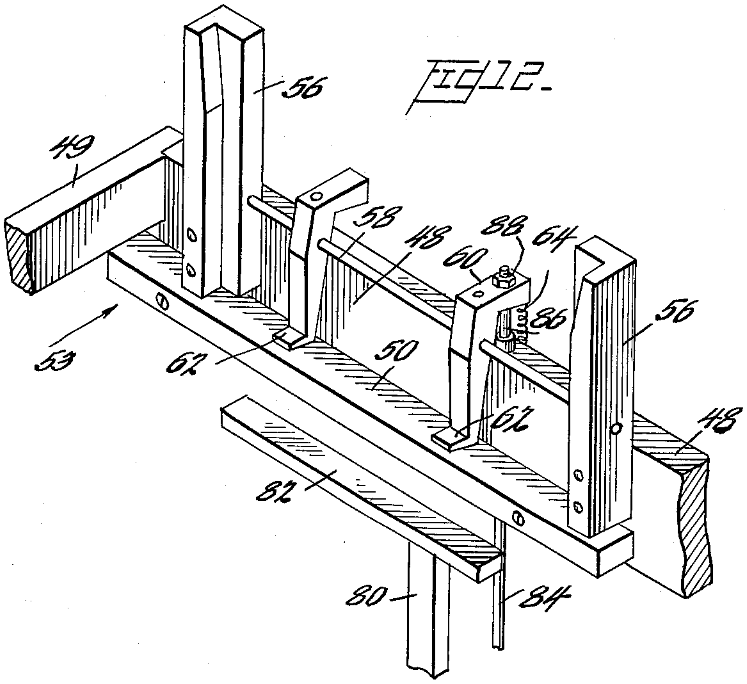

Fig. 12 is a perspective view of a portion of the tray unloading mechanism.

Figures 13, 14, 15:
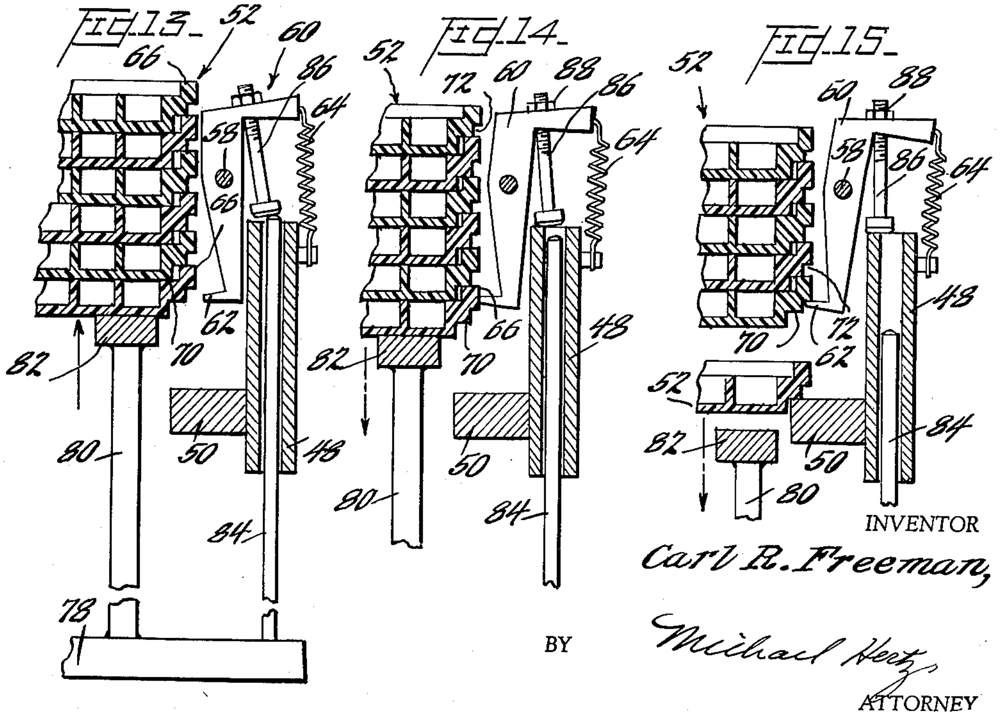

Fig. 13 shows the position of a finger in tray release position.

Figs. 14 and 15 show the operation of the fingers in subsequent stages.

Figures 2, 16:
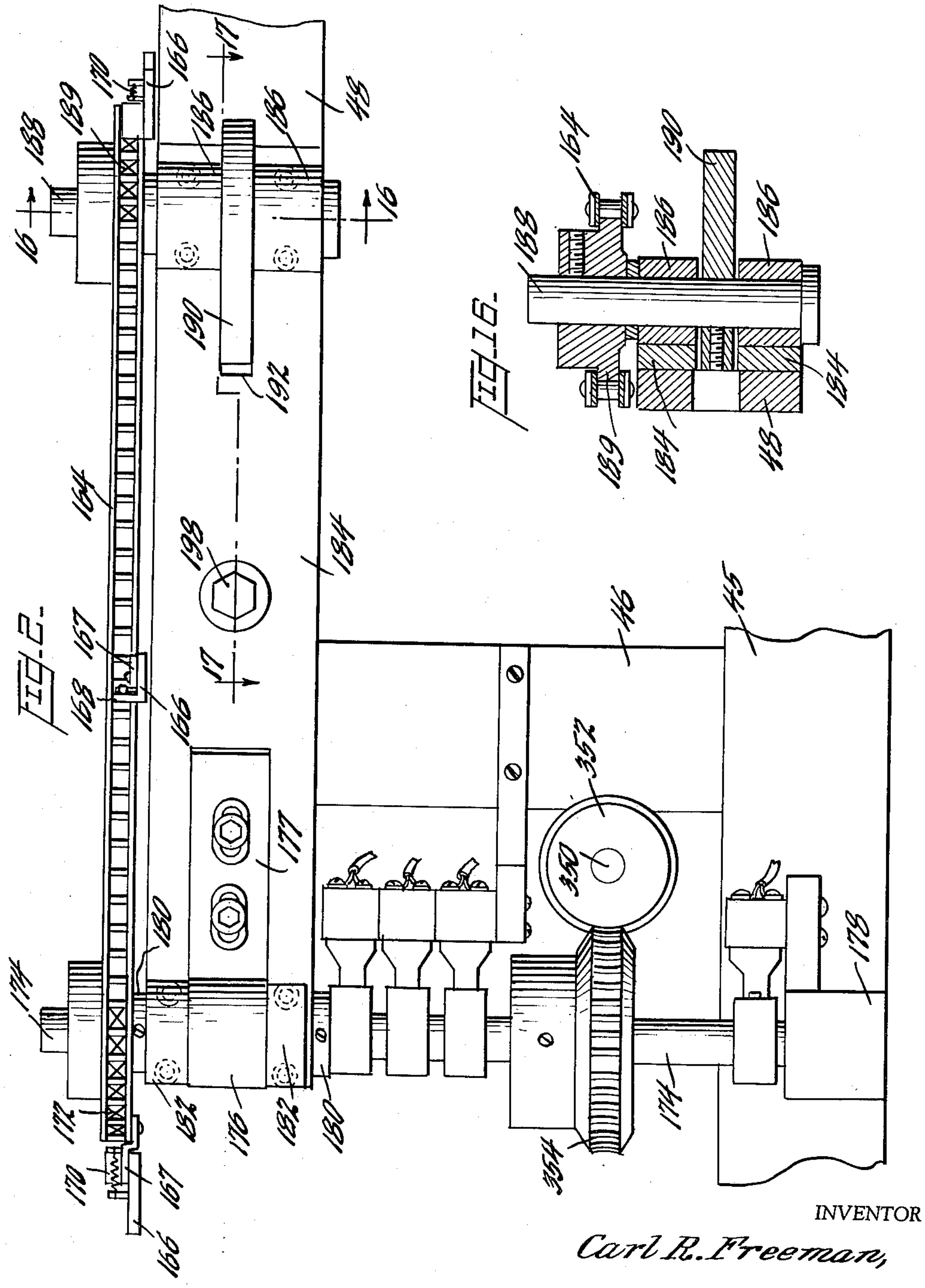
Fig. 2 is a fragmentary view of the machine from the opposite side.

Fig. 16 is a vertical section on the line 16—16 of Fig. 2.

Fig. 17 is a horizontal section on the line 17—17 of Fig. 2.

Fig. 18 is a detail vertical section on the line 18—18 of Fig. 6.

Fig. 19 is a detail view of a pivoted finger on a portion of a finger driving chain, the finger effecting longitudinal movement of the tray.

Fig. 20 is a detail vertical section of a portion of an empty tray stacking mechanism taken on the line 20—20 of Fig. 1.

Figure 21:
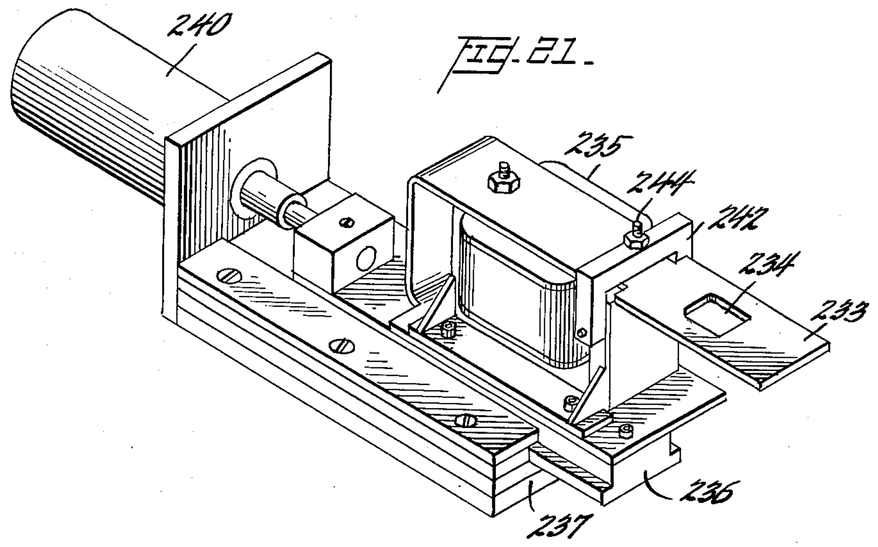

Fig. 21 is a perspective view of a grid vibrator and grid release mechanism.

Figures 4, 22, 23, 24, 25:
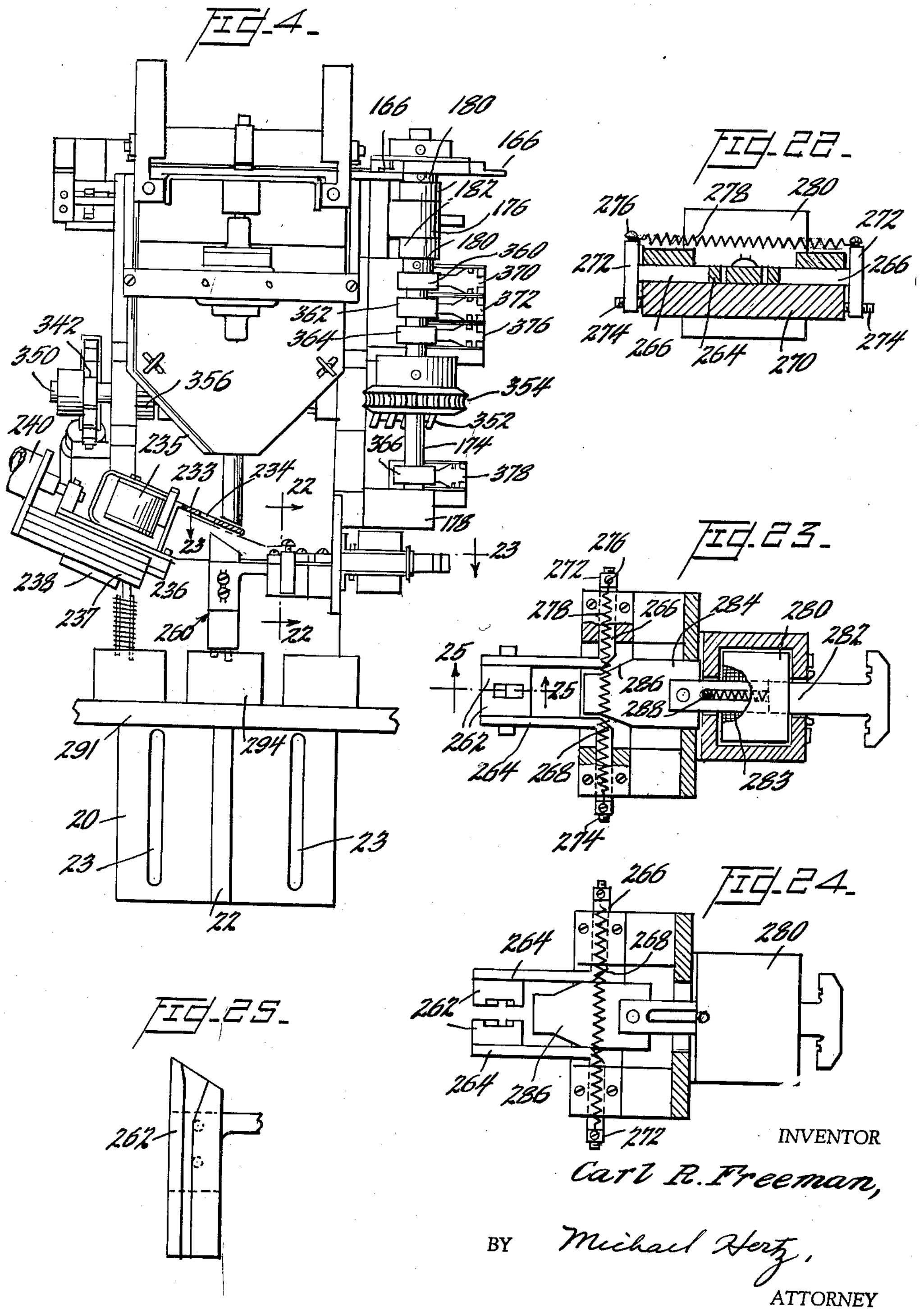
Fig. 4 is a front elevation of the machine.

Fig. 22 is a vertical section through a chute opening mechanism taken on the line 22—22 of Fig. 4.

Fig. 23 is a horizontal section through the same mechanism taken on the line 23—23 of Fig. 4.

Fig. 24 is a view similar to Fig. 23 with the chute in open position.

Fig. 25 is a view of one of the jaws of the chute taken on the line 25—25 of Fig. 23.

Figure 26:
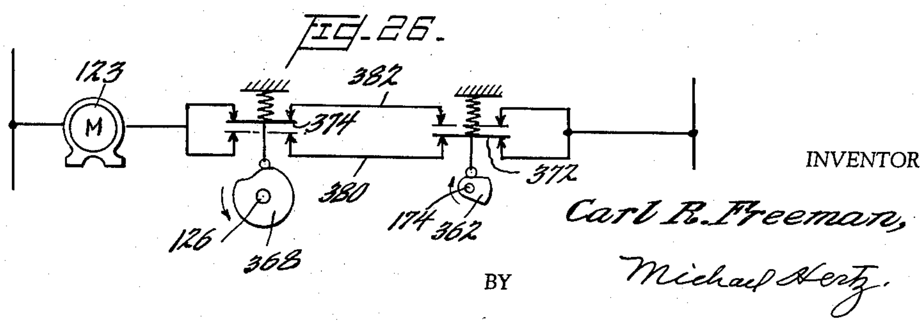
Figure 27:
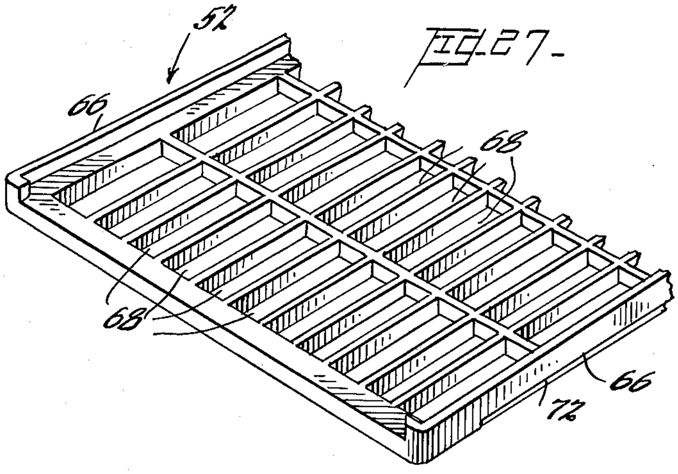

Fig. 26 is a wiring diagram showing the control for one of the machine motors and Fig. 27 is a perspective view of a portion of a tray handled by the machine.

Attached to the base portion of the automount machine is a bracket comprising a vertical rectangular plate 20 having a key-way 22 to permit of vertical adjustment of the bracket on the automount machine and elongated slots 23 through which fastening bolts may be passed and threaded into the automount machine. The bracket also comprises a horizontal rectangular table 24 with a central longitudinal key-way 26 and bolt holes 28 and an angular brace bar 30. Atop the table 24 is a base plate 32 provided on its undersurface with a key-way 34, the table being fastened to the underlying bracket by bolts passing through elongated slots 36 in the base plate 32 and threaded into the table 24. A key 38 lies in the key-ways in the base plate and table.

Surmounting the base is a frame comprised of two bolsters 40 provided with slots 42 through which bolts may be passed into threaded openings 44 in the plate 32 to provide for lateral adjustment and securement of the frame. Thus the frame on the bolsters through the narrow key-ways and slotted bolt holes may be adjusted vertically, longitudinally, and laterally to allow for proper positioning of the frame relative to the automount machine.

The frame comprises a pair of lower sleepers 45, four uprights 46 and a pair of horizontal rails 48, somewhat in the form of a parallelepiped, the frame supporting tray feeding and grid feeding mechanism as will be described. To strengthen the frame, a cross piece 49 joins the rails 48 at corresponding ends of the rails. Fastened along the rails 48 is a pair of track sections 50 along which trays 52 may be slid, as will be described. These trays, fully loaded with articles, are stored in a framework 53 comprised of vertical spaced pairs of angular ways 54 and 56, four in number, one spaced pair 54 being fastened to one of the rails 48 on the other spaced pair 56 being fastened to the opposite rail, the bottoms of the ways being spaced above the rail sections. Pivoted in the pair of ways 54 is a horizontal pivot rod 58 having fastened thereto a pair of spaced tray holding arms 60, each arm having a tray releasing finger 62 normally held by a spring 64 beneath and engaging the lowermost tray of a stack of trays held in the ways. A similar pair of arms is fixed on a rod 58 pivoted in the ways 56. Each tray is compartmented in its upper face. In this specific instance the tray has fifty-five compartments comprised of five rows of compartments arranged in eleven columns. Each tray has upstanding longitudinal walls 66 and compartments 68, the longitudinal walls being offset inwardly at their lower edges as indicated at 70 to allow for stacking of the trays. Also each wall has a recessed portion 72 to accommodate the fingers 62 when they are beneath the trays, and the trays are nonmagnetic.

The trays in the ways 54 and 56 are released from the fingers seriatim by means of the tray release mechanism indicated generically as 74 and comprising an air motor 76 whose piston is fastened to a cross bar 78. The cross bar supports a pair of tray lift uprights 80, each carrying a longitudinal tray support bar 82 which hold the stacked trays while the fingers 62 are removed from beneath the trays by the action of rods 84, fastened to the ends of the cross bar 78, passing through vertical bores in the rails 48 and energizing tappets 86 threaded into the arms 60. These tappets are held in adjusted position by lock nuts 88. When the rods strike the tappets, the arms 60 and shafts 58 are oscillated to release the trays, whereupon the lowermost tray may be lowered onto the track section 50 by downward movement of the support bars 82. Coincidentally with the lowering of the support bars, the rods 84 leave the tappets, allowing the fingers to be urged by the springs 64 into engagement with and beneath the next tray above the one just lowered onto the rail sections.

Trays loaded with articles such as grids are stacked in the ways. After a tray has been deposited on the track sections it is adapted to be fed into a tray inverting mechanism and then fed intermittently through this mechanism to unload the articles, one by one. The tray inverting mechanism comprises a magnet carrying plate 92 and a flat cover plate 94 between which a tray is fed. In the loading position wherein a tray whose compartments are loaded with grids is fed between the plates, the plate 92 is beneath the plate 94. The plate 94 is a stainless steel smooth surfaced plate, rectangular in plan and fastened, as shown in Fig. 10, in a recessed portion of an underlying aluminum plate 96 of like configuration. The plate 92 is of aluminum and substantially coextensive in length and breadth with the opposing plate. It is held spaced from the plates 94 and 96 by a vertical spacing bar 98 fastened at one end to a strap 100 supporting the aluminum plate 92 through the intermediary of two parallel cross straps 102.

At its other end, the vertical spacing bar 98 is fastened to the plate assembly 94, 96 by bolts 104 threaded into holes 106 in the bar 98. At each end of a cross strap 102 there is a screw 110 threaded into the plate 92 and passing freely through the strap. The upper end of each screw is provided with a pair of lock nuts 112 and the plate 92 is resiliently held away from the straps by springs 114. A shaft 108 has a plate portion 109 fastened to the plates 94, 96 by screws or the like and has shaft ends 115 and 116 finding bearing in the rails 48. On the shaft end 116 is a reduced extension 117 to which is fastened a gear 118 meshing with a rack bar 119 supported at the shaft end by a box 120 fastened to the adjacent rail 48 and connected at its other end to the piston 121 of a double acting air motor 122. When the motor has inverted the plate assembly including the plates 92, 94 and 96, see Fig. 6, the top of the now inverted magnet carrying plate 92 is level with the top of rail sections 50. To align the opening between the plates 92 and 94 with the rail sections for proper transfer of trays from the rail sections to between the plates, a stop member 97 is fastened to the top of an upright 46 said stop members having a horizontal arm provided with an adjustable stop screw 99.

To effect the transfer of the tray there is provided an electric motor 123 with reducing gear 124 driving a shaft 126 on which is mounted a cam 128 having a groove 130 in its side face with about 180° concentric with the shaft 126, in which rides a cam follower 132 mounted on a bell crank lever 134, the lever having a shaft 136 oscillatable in a bearing sleeve 138 fastened to the rear end of an extension plate 140 which is secured to one of the sleepers 45. An end of shaft 126 also finds bearing in this plate. Pivoted within a selected one of pivot holes 141 at the upper end of the bell crank 134 is a variable length link 142. The holes provide for variation of stroke of the link while the variable length link provides for change in initial and final position of the element driven by the link. The link drives a horizontal bar 144 fastened to two channel blocks 146 straddling the rail sections 50. The back ends of the channel blocks are connected together by a steadying strap 148. When the blocks 146 are pushed forward, the forward faces of the blocks engage the rear end of the bottommost tray now resting between the rail sections and push the tray in between the plates 92 and 94. After the blocks have been retracted, the plates are inverted by action of motor 122, bringing the magnet carrying plate 92 above the plate 94. The now forward end of plate 94 has a lip 149 which engages a mating portion on fixed apertured plate 150. To prevent articles from rubbing on the face plate 94 and being caught, inadvertently, between partition walls of the tray and the plate, the plate 92, when the articles are of magnetic material, may be channeled as indicated at 151 and provided with small bar magnets 152 set in the channels. The channels correspond in number to the number of columns of compartments in the tray and the magnets are spaced apart in the channels a distance corresponding to the length of a compartment. With five compartments in a column, there would be five magnets in a channel, each set in so that the same pole, as a north pole, faces the same direction in the channels. The poles of the magnets induce poles in the grids so that they tend to cling to the inverted under faces of the trays rather than ride on the smooth plate 94.

After a tray has been transferred from the rail sections 50 and into between the plates 92 and 94, and after the plates have been inverted to bring the channeled plate 92 above the smooth plate 94, an auxilary pusher block 153 comes into play, the bar having a finger 154 in a position to thrust the tray forwardly to position so that the forward end thereof is positioned in abutment with the rear of the previously advanced tray and advances the forward tray slightly. To advance the pusher block, it is mounted on a shaft 155 which at one end is fast with the piston rod 156 of an air motor 158, the opposite end of the shaft being positioned in a guide 160 fastened to a rail 48. A spring 162 returns the block 153 and finger to rest positions. Thereafter intermittent advance of the tray is effected by a chain drive, each tray being advanced intermittently by the finger and chain drive past a given point through as many steps as there are compartments in the tray, in this case fifty-five steps.

The chain drive comprises an endless chain 164 carrying four fingers 166 each spaced from an adjacent finger the length of a tray, each finger beng resiliently pivotally mounted on a support 167 fixed to the chain to allow for pushing of the tray to initial feed position by the pusher finger 154. At this time the tray beng pushed by the finger 154 advances slightly farther than in engagement with a finger 166, which engages the rear of the preceding tray, and actually the newly placed tray pushes the tray ahead of it one step beyond the distance it had been advanced by the finger on the chain, the finger on the chain behind the advance tray yielding during the thrust movement of finger 154, as shown in dotted lines in Fig. 19. A tail 168 on each finger prevents clockwise rotation of the finger beyond where it extends perpendicularly to the chain, while a spring 170 biases the finger to the perpendicular position. The chain is driven by a sprocket wheel 172 on a vertical shaft 174 mounted alongside the frame of the machine in an upper pivot block 176 carried by a plate 177 fastened to the adjoining rail 48 and a lower bearing block 178 fastened to the adjoining sleeper 45, the shaft being held against longitudinal movement with respect to the blocks by collars 180 fixed to the shaft.

Pivoted on the shaft 174 and above and below the pivot block 176 is a pair of support blocks 182 fastened to a chain carrying bar 184 at the free end of which is fastened a pair of vertically spaced support blocks 186, within which is journalled a shaft 188 carrying an idler sprocket 189 at its upper end. Fastened to the shaft between the blocks 186 is a cam 190 adapted to pass through a slot 192 at the free end of the chain carrying bar 184. The chain 164 is trained about the sprockets 172 and 189 and during intermittent movement thereof, just before tray inversion takes place, the free end of the bar together with the corresponding section of the chain and a finger thereon adjacent the end of the bar are pushed away from the rail 48 due to action of cam 190 so that the finger on the chain adjacent the free end of the bar shall not interfere with the pivotal movement of the tray inverting mechanism. After a tray has been inverted, the cam 190 drops into a slot 191 in the adjacent rail 48 and allows the finger adjacent the free end of the bar to move to position behind the newly inverted tray. A spring 196, surrounding a stud 198 which is threaded into the rail 48 and which stud passes freely through the bar 184 pivots the bar 184 to the rail 48.

The tray is intermittently advanced beyond the end of the inverting plates 92, 94 and 96 and over a set of funnels 200, below the apertures 202 in plate 150, said funnels being arranged diagonally of the frame of the machine and there being as many funnels as there are compartments in a row of the tray—in this case, eleven. As the tray is being advanced, first one of the articles in a compartment of a row, then the next, etc., are permitted to drop into the funnels. To prevent rubbing of the articles on the surface of the escapement plate 150 leading to the funnels, a magnet supporting bar 204 is provided, the same supporting small vertical bar magnets 206 and to ensure the tray being held down against the plate 150 a spring 207, bent as shown in Figs. 5 and 6, has its free ends pressing against the top of the inverted tray, with an intermediate portion of the spring fastened to any fixed part of the machine, as for example, the bar 209. The magnets 206 are displaced far enough from the funnels and are weak enough to allow the articles to drop into the funnels when they are pushed thereover by the compartment walls of the tray. When the last article of a row has been unloaded from the tray at one side of the tray, the first one of the next row on the opposite side of the tray starts to unload. As the articles, for example grids, are dropped into the funnels, they come into engagement with stop leaves 208 traversing chutes 210 below the funnels. Each leaf is horizontal and is mounted on a vertical post 212 in turn mounted on a horizontal bar 214 slidable in a slide block 216 provided with eleven channels to accommodate the eleven bars 214. Each of the bars 214 is projected by a spring 218 fastened at one end to a projection 219 fastened to the bar and at its other end to the block 216. To withdraw the stop leaves seriatim, there is provided an intermittently driven cam shaft 220 provided with eleven equally angularly displaced release cams 222 to engage pins 223 on the bottom of the bars 214 which when withdrawn allow the articles in the chutes 210 to drop down onto either of two inclined aisles 224. These aisles are lined with a steel liner made by splitting a pipe 226 at its upper end and flaying out the resulting sides 228 against the lower walls of the aisles. The lower end of the pipe 226 is bevelled as at 230. Within the pipe 226 is a cylindrical insert 232, also bevelled at its lower end and of an internal diameter slightly in excess of the width of the articles, as for example, slightly wider than the major diameter of an elliptically cross sectioned grid. Beneath the bevelled ends of the pipe and insert there is reciprocatable an inclined grid release plate 233 normally blocking the exit of a grid from the pipe. It is provided with a hole 234 which when the slide is projected is brought into registry with the pipe, allowing the grid to fall out of the pipe. The plate is the armature of an electromagnet whose coil 235 is constantly excited, causing a grid in the lower end of the pipe to vibrate and rotate to bring the lower end of the longer side rod of the grid to lower position than the other side rod lower end. Thus the grids are always orientated to the same position. To shift the plate longitudinally, the coil and armature are mounted on a slide 236 having dovetailed sides riding in a complementary track 237 fixed on the machine by a plate 238. The slide is shifted by an air motor 240, whose functioning is controlled by a cam on the automount machine. A yoke 242 and adjustable stop screw 244 limit the vibratory motion of the plate.

Beneath the plate 233 is mounted a split chute 260. The split chute comprises two vertically channeled sections 262 each supported by right angled arm sections 264 and 266, bevelled as at 268 at the juncture of the arms. The arm section 266 rides in a channeled block 270 and has a stop plate 272 at its end provided with an adjustable stop pin 274 to limit the approach movement of the split chute sections. Each plate 272 is further provided with a screw 276, and a spring 278 is tensioned between the screws to maintain the chute sections close to one another. To separate the chute sections there is provided an electromagnet 280 having a core 282 to which is fixed a tongue 284 provided with a bevelled end 286 adapted to wedge in between the bevelled portions 268 of the right angled arms. A spring 283 reacting between a fixed pin 288 and the core serves to retract the slide when the electromagnet is deenergized. An article released by the plate 233 will fall through the split chute and will come to rest with its lower end in a support 290 on the automount machine. The support 290 may be one of a number on an indexible turret 291 and has vertical holes in the support to hold the lower ends of the grid side rods with the major portion of the grid lying in the split chute. Synchronously with indexing movement of the turret, the chute sections are opened by energization of the electromagnet 280 under control of a cam in the automount machine to allow for removal of the grid from the grid loading mechanism.

After a tray has been unloaded it is gradually moved by the movement of the next succeeding tray until it slides onto rail extensions 292. These extensions are fastened to the inner faces of the rails 48 and each is recessed at the end adjacent its rail 48 to accommodate the sides of the escapement plate 150. The escapement plate is channeled as at 294 and the rail extensions are angled to provide a depressed surface 296 in alignment with the channels 294 so that the walls 66 of the tray may slide without hinderance along the channels 298 in the composite plate 94, 96, the channels 294 in the escapement plate and on the depressed surface 296.

After a tray has been advanced until it is in registration with an empty tray storage rack or bin 299, comprised in part, of four angled posts 300, 302, 304 and 306, it is lifted by an elevator air motor 308. The storage bin posts 300 and 302 have bevelled ends 310 to facilitate the movement of the rear end of the tray into the bin while the forward posts have longer bevelled surfaces 312 to accommodate the forward end of the tray. Also the posts 304 and 306 are channelled as at 314 to allow a tray to be removed from the elevator without upstacking into the posts. The trays are lifted upwardly by the motor 308 and by a platform 316 normally positioned below the level of the depressed surfaces 296, the platform being fastened by screws or the like to a block 318 fastened to the piston rod of the motor 308, the motor being fastened to a cross piece 320 joined to hangers 322 depending from the rail extensions 292. To maintain the trays in the storage rack, the pair of posts 300 and 304 and the pair of posts 302 and 306 are each bridged by a pivotable rod 322 each rod having fastened thereto a pair of fingers 324, and each finger being normally held in a horizontal position and with a tail portion in engagement with a stop rail 326 by a spring 328. On upstacking movement of an elevated tray, the fingers will yield to allow the tray to be pushed above the fingers and then they will be brought to horizontal position to engage the undersurface of the tray as the elevator platform lowers. The empty trays may be removed from the top of the bin by an operator, at will.

The parts of the grid loader are driven in timed synchronism with the automount machine to which the grids are fed and are controlled by cams on the automount machine. For every index operation of the automount machine, for example for every index movement of the turret 291, a cam on the automount machine, operating on a switch, momentarily opens an air pressure valve to an air motor 334 longitudinally adjustably mounted on a sleeper 45 of the machine. The piston of the motor is surmounted by a carrier block 336 pivotally mounting a pawl 338 pressed as by a spring 340 against a ratchet wheel 342 mounted on a main timing shaft 350.

The timing shaft is supported in bearings 351 affixed to the uprights 46 of the frame and at the end opposite to the ratchet is provided with a worm 352 meshing with a worm gear 354 fixed on the vertical shaft 174. With the fifty-five compartmented tray selected as an example, the ratchet could have eleven teeth, while the worm and worm gear would have a gear ratio of one to five. Thus with a fifty-five compartmented tray, each index movement of the motor would impart a $\frac{1}{55}$ of a revolution to the shaft 174. Since the sprocket gear 172 is coupled to the chain 164 and its fingers 166, each movement of the shaft would impart a movement to the fingers 166 and the tray would be pushed by the fingers sufficiently to move a compartment in the tray over one of the funnel openings 200 to release a grid, the grids dropping in sequence into the diagonally arranged funnels. The timing shaft 350, besides having the worm affixed thereto, fixedly carries a gear 356 meshing in a one to one ratio with a second gear 358 fixed on the cam shaft 220 whereby the release of grids in the chute by action of the cams on the leaves 208 is controlled indirectly by automount machine operation. Likewise the automount machine has a cam which momentarily closes a circuit to the motor 240 to advance the grid release slide 233 after the support 294 has been indexed beneath the split chute. Furthermore another cam on the automount machine energizes the split chute operating electromagnet 280 just prior to and during indexing of the turret 291.

Also mounted on the shaft 174 are a group of three cams 360, 362 and 364 and a fourth cam 366. Another switch controlling cam 368 is mounted on the shaft 126 on which is mounted the large cam 128. The cam 360 operates on a switch 370 which when closed opens a valve to supply fluid pressure to the tray release motor 76 and to the auxiliary pusher finger air motor 158. The cam 362 controls a 3-way switch 372. When the plunger of this switch is depressed it initiates the rotation of electric motor 123 which drives the cam 128 to shift a loaded tray from onto the rails below the loaded trays into between the inverted plates. The switch 372 is connected with a second three way switch 374 controlled by the cam 368 on shaft 126 and which switch normally has its plunger operated by the cam against the tension of a spring. The cam 364 closes a switch 376 which effects opening of an air valve to feed compressed air to the plate inverting motor 122. The cam 366 closes a switch 378 which operates an air valve to supply air to the empty tray elevator motor 308. The cam 362 on shaft 174 normally maintains switch 372 on line 380 while cam 368 normally retains switch 374 on parallel line 382. When cam 362 operates switch 372 against its spring, the motor 123 is energized via line 382 and is maintained energized by closure of switches 372 and 374 on line 382 unitil cam 368 releases switch 374 whereupon the motor momentarily stops with the switch 374 closed on line 380. Subsequently switch 372 is released to allow switch 372 to close on line 380 whereupon the motor is again energized for a short angular movement of cam 368 and until a high part of cam 368 again closes switch 374 on line 382, thus completing a cycle of the shaft 126, cam 128 and a cycle of throw of the pusher channel blocks 146.

The operation of the cam 128 is very fast compared to the step by step movement of cam 362 on shaft 174.

What is claimed as new is:

1. In a compartmented tray and article feeding machine, a storage framework for reeciving compartmented trays with their compartments loaded with articles, the compartments opening upwardly, horizontal parallel rails below the framework, means for lowering trays seriatim onto the rails, a tray inverting mechanism including a plate to cover the open compartments, a thrust mechanism shiftable parallel to the rails to thrust a tray on the rails into the inverting mechanism when the same is in tray receiving position, means to operate the inverting mechanism to bring the thrust in tray to a position wherein the compartments open downwardly and with the cover plate beneath the tray, a pusher for initially advancing the tray through the inverting mechanism when the same is in tray delivering position into engagement with a previous tray which had been in the inverting mechanism, and to advance said previous tray a slight distance, an empty tray storage rack at an end of the machine, an intermittently driven mechanism for subsequently moving the newly inserted tray and for moving the tray ahead of it to a position below the storage rack, said pusher having advanced the newly inverted tray so that the rear portion of the tray may be engaged by the intermittently driven mechanism, funnels aligned transversely of the trays in advance of the storage rack and beneath the trays, with the mouths of the funnels exposed to the trays, to receive articles as they fall out of the compartments, and means to elevate the trays beneath the storage rack thereinto.

2. In a compartment tray and article feeding machine, a storage framework for receiving compartmented trays with their compartments loaded with articles, the compartments opening upwardly, horizontal parallel rails below the framework, means for lowering trays seriatim onto the rails, a tray inverting mechanism including a plate to cover the open compartments, a thrust mechanism shiftable parallel to the rails to thrust a tray on the rails into the inverting mechanism when the same is in tray receiving position, means to operate the inverting mechanism to bring the thrust in tray to a position wherein the compartments open downwardly and with the cover plate beneath the tray, a pusher for initially advancing the tray through the inverting mechanism when the same is in tray delivering position into engagement with a previous tray which had been in the inverting mechanism, and to advance said previous tray a slight distance, an empty tray storage rack at an end of the machine, an intermittently driven mechanism for subsequently moving the newly inserted tray and for moving the tray ahead of it to a position below the storage rack, said pusher having advanced the newly inverted tray so that the rear portion of the tray may be engaged by the intermittently driven mechanism, funnels aligned transversely of the trays, with the mouths of the funnels exposed to the trays, and at an oblique angle to the trays in advance of the storage rack and beneath the trays to receive articles as they fall out of the compartments, and means to elevate the trays beneath the storage rack thereinto.

3. In a compartmented tray and article feeding machine, a storage framework for receiving compartmented trays with their compartments loaded with articles, the compartments opening upwardly, horizontal parallel rails below the framework, means for lowering trays seriatim onto the rails, a tray inverting mechanism including a plate to cover the open compartments, a thrust mechanism shiftable parallel to the rails to thrust a tray on the rails into the inverting mechanism when the same is in tray delivering position, means to operate the inverting mechanism to bring the thrust in tray to a position wherein the compartments open downwardly and with the cover plate beneath the tray, a pusher for initially advancing the tray through the inverting mechanism when the same is in tray delivering position into engagement with a previous tray which had been in the inverting mechanism, and to advance said previous tray a slight distance, an empty tray storage rack at an end of the machine, an intermittently driven mechanism for subsequently moving the newly inserted tray and for moving the tray ahead of it to a position below the storage rack, said pusher having advanced the newly inverted tray so that the rear portion of the tray may be engaged by the intermittently driven mechanism, funnels aligned transversely of the trays in advance of the storage rack and beneath the trays, with the mouths of the funnels exposed to the trays, to receive articles as they fall out of the compartments, means to elevate the trays beneath the storage rack thereinto, chutes below the funnels, a stop plate for each funnel movable into and out of its chute, and means for moving said stop plates seriatim out of the chutes in synchronism with the movements of the intermittently driven mechanism.

4. In a compartmented tray and article feeding machine, a storage framework for receiving compartmented trays with their compartments loaded with articles, the compartments opening upwardly, horizontal parallel rails below the framework, means for lowering trays seriatim onto the rails, a tray inverting mechanism including a plate to cover the open compartments, a thrust mechanism shiftable parallel to the rails to thrust a tray on the rails into the inverting mechanism, means to operate the inverting mechanism to bring the thrust in tray to a position wherein the compartments open downwardly and with the cover plate beneath the tray, a pusher for initially advancing the tray through the inverting mechanism into engagement with a previous tray which had been in the inverting mechanism, and to advance said previous tray a slight distance, an empty tray storage rack at an end of the machine, an intermittently driven mechanism for subsequently moving the newly inserted tray and for moving the tray ahead of it to a position below the storage rack, funnels aligned transversely of the trays in advance of the storage rack and beneath the trays, with the mouths of the funnels exposed to the trays, to receive articles as they fall out of the compartments, means to elevate the trays beneath the storage rack thereinto, chutes below the funnels, a stop plate for each funnel movable into and out of its chute, means for moving said stop plates seriatim out of the chutes in synchronism with the movements of the intermittently driven mechanism, a common outlet pipe for all of the funnels, an inclined stop below the pipe, means for vibrating the stop, and means for shifting the stop out of the path of an article in the pipe, to allow the article to drop therethrough.

5. In a compartment tray and article feeding machine, a storage framework for receiving compartmented trays with their compartments loaded with articles, the compartments opening upwardly, horizontal parallel rails below the framework, means for lowering trays seriatim onto the rails, a tray inverting mechanism including a plate to cover the open compartments, a thrust mechanism shiftable parallel to the rails to thrust a tray on the rails into the inverting mechanism, means to operate the inverting mechanism to bring the thrust in tray to a position wherein the compartments open downwardly and with the cover plate beneath the tray, a pusher for initially advancing the tray through the inverting mechanism into engagement with a previous tray which had been in the inverting mechanism, and to advance said previous tray a slight distance, an empty tray storage rack at an end of the machine, an intermittently driven mechanism for subsequently moving the newly inserted tray and for moving the tray ahead of it to a position below the storage rack, funnels aligned transversely of the trays in advance of the storage rack and beneath the trays, with the mouths of the funnels exposed to the trays, to receive articles as they fall out of the compartments, means to elevate the trays beneath the storage rack thereinto, chutes below the funnels, a stop plate for each funnel movable into and out of its chute, means for moving said stop plates seriatim out of the chutes in synchronism with the movements of the intermittently driven mechanism, a common outlet pipe for all of the funnels, an inclined stop below the pipe, means for vibrating the stop, means for shifting the stop out of the path of an article in the pipe, to allow the article to drop therethrough, a split guide chute beneath the inclined stop to receive the dropped article, and a shiftable support beneath the chute, the article when released by the stop falling through the guide chute and into the support, and means for opening the split chute to permit the article to move with the shiftable support when the support is moved.

6. In a non-magnetic compartmented tray and magnetic article feeding machine, a horizontal trackway for receiving an article loaded compartmental tray with the compartments opening upwardly, a tray inverting mechanism including a cover plate overlying the tray to cover the open compartments and an underlying plate below the tray, said underlying plate having grooves parallel to the trackway, magnets arranged longitudinally in said grooves, a thrust mechanism shiftable parallel to the trackway to thrust a tray on the trackway into the inverting mechanism, means to operate the inverting mechanism to reverse the overlying and underlying positions of the cover and grooved plates, said magnets serving to hold the articles against the tray and away from the cover plate, advancing mechanism for moving the tray through the inverting mechanism, and funnels below the level of the trays, with the mouths of the funnels exposed to the trays, and beyond the inverting mechanism arranged transversely of the horizontal trackway in line with the compartments in the tray for receiving the articles as the tray is projected beyond the influence of the magnets and through the inverting mechanism.

7. In a non-magnetic compartmented tray and magnetic article feeding machine, wherein said tray has compartments in rows and columns, mechanism for horizontally feeding said tray through the machine with compartments opening downwardly, a non-magnetic plate above the tray against the underside of which it slides, magnets in said plate to hold magnetic articles in said tray compartments against falling a funnel device having receiving openings arranged diagonally across the path of travel of the tray and beyond the non-magnetic plate, a support above the funnel device and located between the openings and the non-magnetic plate, and auxiliary magnets located in said support and arranged parallel to the receiving openings, said auxiliary magnets being located sufficiently far from the funnel openings and of such strength as to allow the articles in the tray to drop into the openings seriatim.

8. In a compartmented tray feeder and article handling machine, a track for receiving a compartmented tray with compartments opening upwardly and loaded with articles, a pair of spaced plates pivotable to a position wherein the space between the plates is aligned with the track, first means for thrusting a tray between the plates, said plates being pivoted on an axis above the two plates when in said position, second means for inverting the plates to bring the tray to an inverted position with compartments opening downwardly and with the tray on a higher elevation, third means acting while said tray is at the higher elevation to load the tracks with another tray and to project the tray forwardly part way through the plates, fourth means to thereafter intermittently advance the inverted tray, said third means advancing the tray to where the fourth means may engage a rear portion of the tray, a stationary plate over which the tray slides and a series of funnels below said stationary plate to receive the articles in the tray.

9. In a means for feeding a compartmented tray, a horizontal trackway for receiving a tray loaded with articles, an inverting pair of parallel plates pivoted on an axis offset from the plane of the horizontal trackway and pivotable to a position where the trackway is aligned with the space between the plates, pusher means for engaging a tray on the trackway to thrust the tray into between the plates when so aligned, means for pivoting the plates to bring them to a higher elevation, a second pusher operative at the higher elevation of the plates to thrust the tray partially out of between the plates, and an intermittently driven finger engaging the tray to thrust it still further out between the plates, said second pusher advancing the tray to where the finger may engage a rear portion of the tray, means for moving said finger out of the path of the plates upon inverting movement thereof and means for receiving the articles in the tray when the advancing end of the tray has progressed sufficiently beyond the plates.

10. In a means for feeding a compartmented tray through between a pair of invertible plates, a framework having a slot, a rotatable horizontal shaft in said framework, a pair of spaced plates which are, in one position of the plates, supported by and below the shaft, means for feeding a tray in between the plates when they are in said one position, means on the frame for oscillating the shaft to bring the plates to a higher elevation, means engageable with the trailing end of a tray between the plates when they are at the higher elevation for initially entering the space between the plates to initially advance the tray, an intermittently driven conveyor mounted on a bar pivoted at one end, fingers on said conveyor engageable with the trailing end of the tray after initial advance thereof to further advance the tray, a cam on the free end of the bar rotatable as the conveyor moves and reacting against the framework to move a finger out of the path of the inverting plates, a spring to pivotally urge the bar toward the framework, said bar moving to bring the finger between the plates when the cam can enter the slot in the framework and means for receiving articles dropping from the tray after the tray is projected from between the plates.

11. In a machine for handling articles deposited in trays having compartments arranged in rows and columns, a tray inverting mechanism including a cover plate for the open compartments of the tray, means for inserting the tray beneath the cover plate, means for inverting the tray and cover means, a fixed apertured plate which is in the same plane as the inverted tray, funnels below the apertures in the plate, the apertures running diagonally of the travel of the tray, means for intermittently advancing the tray to allow articles to drop one by one from the compartments into the apertures, a receiving support for the articles below the apertures, and gate means operated in synchronism with the tray advancing means and intermediate the apertured plate and the support to ensure the feeding of a single article to the support.

12. In a machine for handling articles deposited in trays having compartments arranged in rows and columns, a tray inverting mechanism including a cover plate for the open compartments of the tray, means for inserting the tray beneath the cover plate, means for inverting the tray and cover means, a fixed apertured plate which is in the same plane as the inverted tray, funnels below the apertures in the plate, the apertures running diagonally of the travel of the tray, means for intermittently advancing the tray to allow articles to drop one by one from the compartments into the apertures, a receiving support for the articles below the apertures, means intermediate the apertured plate and the support to ensure the feeding of a single article to the support, said intermediate means comprising a number of chutes one for each aperture in the plate, a withdrawable stop leaf in each chute, a common pipe communicating with all of the chutes and a single release plate with means for operating the same beneath the pipe.

13. A tray advancing and article handling machine comprising a frame, a main timing shaft rotatable in said frame and transverse thereto, an intermittent drive mechanism connected to said shaft, a vertical drive shaft mounted alongside the frame at a forward end thereof and gear driven at a reduced rate from the timing shaft, a conveyor carrying bar pivoted on the vertical shaft, a vertical idler shaft at the free end of said bar, a driven sprocket wheel on the idler shaft, a conveyor trained about the wheels, equally spaced fingers on the conveyor, a tray inverting mechanism pivotally mounted in the frame, a finger on the conveyor being engageable with the rear end of a tray in said inverting mechanism, a cam fixed on the idler shaft having a surface engaging the frame to swing the idler shaft and adjacent end of the bar away from the frame, an opening in the frame alongside of the area of contact of cam and frame to permit a portion of the cam to enter the frame, as the cam revolves, a spring to urge the bar toward the frame against the action of the cam, a plate having article receiving openings beyond the inverting mechanism, chutes communicating with said openings, a stop leaf in each chute and means for withdrawing said stop leaves, seriatim, comprising a cam shaft parallel with the timing shaft and geared thereto with a one to one ratio, cams on said cam shaft, the number of cams on said cam shaft corresponding to the number of stop leaves and equally spaced about the cam shafts, and slides carrying the leaves, engaged seriatim by said cams.

14. A tray advancing and article handling machine comprising a frame, a main timing shaft rotatable in said frame and transverse thereto, an intermittent drive mechanism connected to said shaft, a vertical drive shaft mounted alongside the frame at a forward end thereof and gear driven at a reduced rate from the timing shaft, a conveyor carrying bar pivoted on the vertical shaft, a vertical idler shaft at the free end of said bar, a driven sprocket wheel on the idler shaft, a conveyor trained about the wheels, equally spaced fingers on the conveyor, a tray inverting mechanism pivotally mounted in the frame, a finger on the conveyor being engageable with the rear end of a tray in said inverting mechanism, a cam fixed on the idler shaft having a surface engaging the frame to swing the idler shaft and adjacent end of the bar away from the frame, an opening in the frame alongside of the area of contact of cam and frame to permit a portion of the cam to enter the frame, as the cam revolves, a spring to urge the bar toward the frame against the action of the cam, a plate having article receiving openings beyond the inverting mechanism, chutes communicating with said openings, a stop leaf in each chute, and means for withdrawing said stop leaves, seriatim, comprising a cam shaft parallel with the timing shaft and geared thereto with a one to one ratio, cams on said cam shaft, the number of cams on said cam shaft corresponding to the number of stop leaves and equally spaced about the cam shafts, slides carrying the leaves, engaged seriatim by said cams, a plurality of cams on said vertical shaft and switches under control of said cams, means for feeding a tray to the level of the tray inverting mechanism in an initial position of the inverting mechanism under control of a first one of said switches, means for initially feeding said tray into the inverting mechanism under control of a second one of said switches, means for inverting the mechanism to bring the mechanism to a second position under control of a third one of said switches, means for initially feeding an inverted tray through the inverting mechanism, said means also being under control of the first one of the switches and operating to advance an inverted tray while a subsequent tray is brought to the initial level of the inverting mechanism, an empty tray receiving bin and motor means to transfer an empty tray into said bin, and means under control of a fourth one of said switches for controlling said motor means.

15. A tray advancing and article handling machine comprising a frame, a main timing shaft rotatable in said frame and transverse thereto, an intermittent drive mechanism connected to said shaft, a vertical drive shaft mounted alongside the frame at a forward end thereof and gear driven at a reduced rate from the timing shaft, a conveyor carrying bar pivoted on the vertical shaft, a vertical idler shaft at the free end of said bar, a driven sprocket wheel on the idler shaft, a conveyor trained about the wheels, equally spaced fingers on the conveyor, a tray inverting mechanism pivotally mounted in the frame, a finger on the conveyor being engageable with the rear end of a tray in said inverting mechanism, a cam fixed on the idler shaft having a surface engaging the frame to swing the idler shaft and adjacent end of the bar away from the frame, an opening in the frame alongside of the area of contact of cam and frame to permit a portion of the cam to enter the frame, as the cam revolves, a spring to urge the bar toward the frame against the action of the cam, a plate having article receiving openings beyond the inverting mechanism, chutes communicating with said openings, a stop leaf in each chute and means for withdrawing said stop leaves, seriatim, comprising a cam shaft parallel with the timing shaft and geared thereto with a one to one ratio, cams on said cam shaft, the number of cams on said cam shaft corresponding to the number of stop leaves and equally spaced about the cam shafts, slides carrying the leaves, engaged seriatim by said cams, a plurality of cams on said vertical shaft and switches under control of said cams, means for feeding a tray to the level of the tray inverting mechanism in an initial position of the inverting mechanism under control of a first one of said switches, means for initially feeding said tray into the inverting mechanism under control of a second one of said switches, means for inverting the mechanism to bring the mechanism to a second position under control of a third one of said switches, means for initially feeding an inverted tray through the inverting mechanism, said means also being under control of the first one of the switches and operating to advance an inverted tray while a subsequent tray is brought to the initial level of the inverting mechanism, an empty tray receiving bin, and means to transfer an empty tray into said bin, means under control of a fourth one of said switches for controlling said motor means, said means for initially feeding a tray into the inverting mechanism comprising an electric motor, a shaft driven by said motor, a cam fixed on said shaft, a tray pusher at the initial level of the inverting mechanism, a linkage between the cam and the tray pusher, a second, switch controlling, cam on the motor driven shaft, a fifth switch controlled thereby, said fifth switch and second switch being wired in parallel and in series with the electric motor, with the cams which operate on these switches operating out of step on these switches, whereby a full revolution may be imparted to the electric motor driven shaft.

References Cited in the file of this patent

UNITED STATES PATENTS

| | | |
|---|---|---|
| 895,899 | Schneck | Aug. 11, 1908 |
| 1,437,409 | Evans et al. | Dec. 5, 1922 |
| 1,450,423 | Reese et al. | Apr. 3, 1923 |
| 2,226,068 | Mosley et al. | Dec. 24, 1940 |
| 2,285,068 | Titus | June 2, 1942 |
| 2,470,889 | Drescher | May 24, 1949 |
| 2,526,309 | Welch | Oct. 17, 1950 |
| 2,744,372 | Cleaveland et al. | May 8, 1956 |